No. 878,355. PATENTED FEB. 4, 1908.
J. E. COOPER.
JOURNAL BOX FOR ROAD AND OTHER VEHICLES.
APPLICATION FILED APR. 5, 1907.
2 SHEETS—SHEET 1.
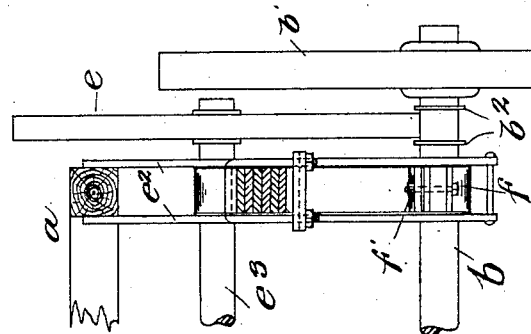
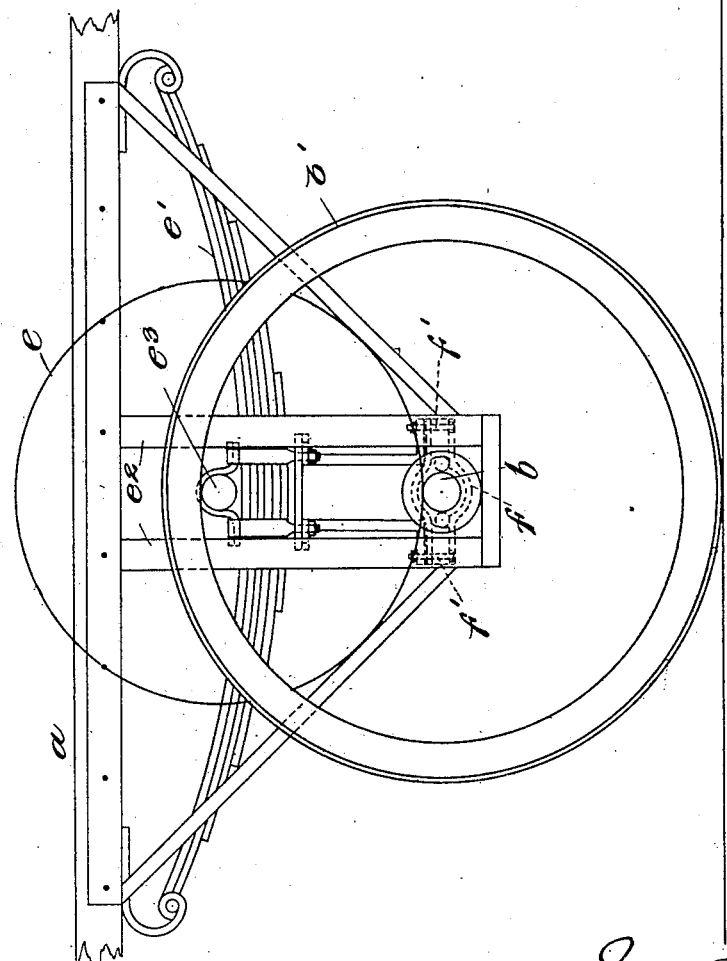

No. 878,355. PATENTED FEB. 4, 1908.
J. E. COOPER.
JOURNAL BOX FOR ROAD AND OTHER VEHICLES.
APPLICATION FILED APR. 5, 1907.
2 SHEETS—SHEET 2.
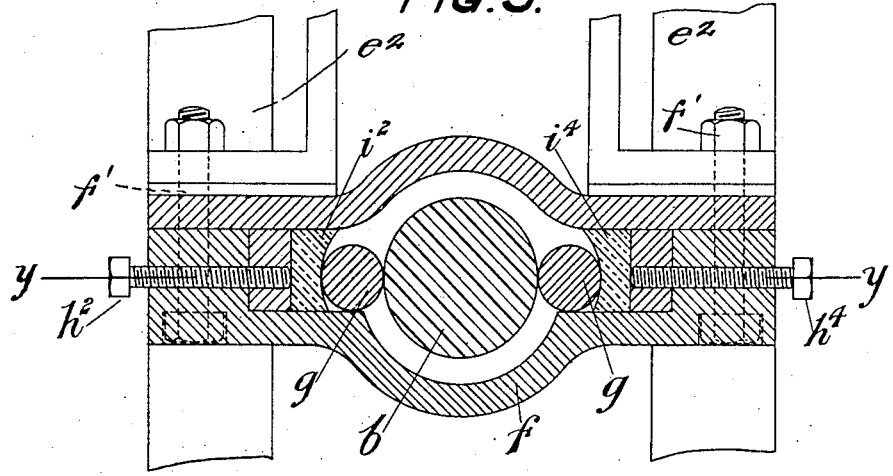
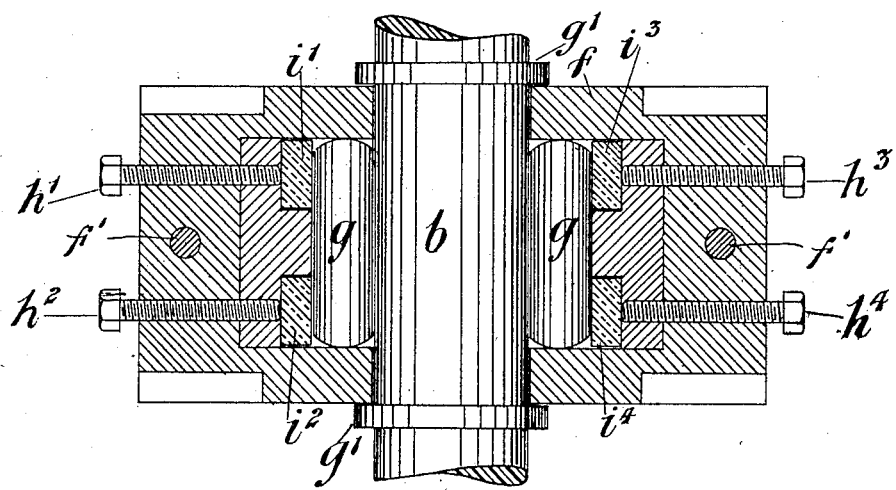

UNITED STATES PATENT OFFICE.

JOHN EDWARD COOPER, OF STRATFORD, LONDON, ENGLAND.

JOURNAL-BOX FOR ROAD AND OTHER VEHICLES.

No. 878,355.  Specification of Letters Patent.  Patented Feb. 4, 1908.

Application filed April 5, 1907. Serial No. 366,569.

*To all whom it may concern:*

Be it known that I, JOHN EDWARD COOPER, a subject of the King of Great Britain and Ireland, residing at Stratford, in the county of London, England, have invented certain new and useful Improvements in Journal-Boxes for Road and Similar Vehicles; and I do hereby declare the following to be a full, clear, and exact description of the invention, such as will enable others skilled in the art to which it appertains to make and use the same.

This invention relates to journal boxes as applied to the shafts of road and the like vehicles, and is especially adapted for use in conjunction with antifriction mechanism of the kind described in the specifications of my former Letters Patent Nos. 621,483, dated 21st March 1899, 681,650, dated 27th August 1901, 764,427, dated 5th July 1904, and 769,130, dated 30th August 1904, whereby the load is transmitted to the carrying or running wheels through antifriction gear and comprising large antifriction wheels which bear upon and roll in contact with the lower or main journal axles. In order to effect the proper working of such antifriction gear, while it is essential that the disk and shaft should be maintained in proper rolling contact with each other, it is also important that there should be no lateral or side play, and in conjunction with this that means of adjustment be provided for taking up wear and tear from time to time.

This invention therefore has for its object to effect improvements whereby such rolling contact may be accurately maintained in respect of the journal box adjustments for carrying the main axle.

Having thus indicated the nature of my invention in general terms, in order that it may be clearly understood and readily carried into effect, I will proceed to describe the same in detail, reference being had to the accompanying drawings, in which the like letters of reference indicate corresponding parts in all the figures.

Figure 1 is a view is side elevation of part of a vehicle showing my improvement. Fig. 2 is an end view of the same, parts being shown in section. Fig. 3 is an enlarged vertical sectional view of the journal box. Fig. 4 is a section on the line $y$—$y$ of Fig. 3.

Referring to the drawings, $a$ designates a vehicle having a lower or main axle $b$ on the end of which is mounted the wheel $b'$. Suspended by a spring $e'$ between a hanger $e^2$ hung from the vehicle frame, I mount a second axle $e^3$. This second axle is mounted directly above the main axle $b$ and carries a disk $e$ the periphery of which bears upon the circumference of the main axle. To prevent lateral movement of the same I provide the main axle $b$ with two fixed collars $b^2$.

A split axle box $f$ encircles the lower or main axle $b$ and is rigidly held together by bolts $f'$. These bolts $f'$ also hold the axle boxes securely to the hanger $e^2$. Mounted in the axle box $f$ on either side of the axle $b$ are two adjustable anti-friction rollers $g$—$g$. In order to adjust these rollers to the main axle shaft, I provide four set screws $h'$—$h^2$—$h^3$—$h^4$, which engage corresponding brass bearing pieces $i'$—$i^2$—$i^3$—$i^4$, which abut against the rollers in the manner shown. In order to prevent endwise oscillation of the axle in its bearings, collars $g'$, $g'$ are provided, the rollers and collars taken in conjunction serving instead of fixed side bearings which of course are liable to wear and require repairing. The rollers on the other hand can be adjusted to always maintain the top and bottom axles in perfect vertical alinement, one with the other, and when employed, the axle, which is preferably as light as possible, does not have to be weakened by recesses.

By the arrangement just described, it may be readily seen that the adjustment can be quickly and accurately made. The construction is very simple, there being no small parts, the whole being made so that it may be quickly taken apart to permit repairs.

Having now described my invention, what I desire to claim and secure by Letters Patent of the United States, is:—

1. In an antifriction mechanism, the combination of an upper axle, a lower axle, suitable connections between the same, said lower axle provided with collars, a split box, antifriction devices and bearing pieces placed on each side of said lower axle in said box between said collars and set screws contacting with said bearing pieces for adjusting said antifriction devices, whereby lateral friction is lessened and the upper and lower axles may be maintained always in proper vertical alinement, substantially as described.

2. In antifriction mechanism of the kind hereinbefore referred to, the combination of a hanger, an upper axle and a lower axle provided with collars horizontally hung in said hanger, a split box securely held at the lower end of said hanger, side rollers contained in the said split box, bearing pieces placed on each side of said rollers in each side of said box and between said collars, and set screws contacting with said bearing pieces for adjusting the same, whereby lateral friction is lessened and the said lower axle can be always maintained in proper vertical alinement with said upper axle, substantially as described.

3. In an antifriction mechanism, the combination of a hanger, an upper axle loosely mounted in the same, a spring on which the same rests, a lower axle securely held at the lower end of said hanger, suitable connections between the said upper axle and said lower axle, said lower axle provided with collars, a split box securely held in said hanger, antifriction devices and bearing pieces placed on each side of said lower axle in said split box and between said collars and set screws for contacting with said bearing pieces and for adjusting said antifriction devices, whereby lateral friction is lessened and the upper and lower axles may be maintained always in proper vertical alinement, substantially as described.

In testimony whereof, I affix my signature, in presence of two witnesses.

JOHN EDWARD COOPER.

Witnesses:
   CON. CROWLEY,
   T. W. JONES.